United States Patent [19]

Howell

[11] 4,271,444
[45] Jun. 2, 1981

[54] GROUND FAULT TRIP MODE NETWORK FOR STATIC TRIP CIRCUIT BREAKERS

[75] Inventor: Edward K. Howell, Simsbury, Conn.

[73] Assignee: General Electric Company, New York, N.Y.

[21] Appl. No.: 62,387

[22] Filed: Jul. 31, 1979

[51] Int. Cl.³ .............................................. H02H 3/16
[52] U.S. Cl. ....................................... 361/48; 361/96
[58] Field of Search ...................... 361/47, 48, 49, 50, 361/44, 45, 42, 63, 96, 97, 94, 95

[56] References Cited

U.S. PATENT DOCUMENTS

| | | | |
|---|---|---|---|
| 3,619,723 | 11/1971 | Walden | 361/45 |
| 3,697,810 | 10/1972 | Wilson et al. | 361/44 |
| 3,899,717 | 8/1975 | Legatti et al. | 361/44 X |
| 4,115,829 | 9/1978 | Howell | 361/44 X |
| 4,121,269 | 10/1978 | Hobson, Jr. | 361/44 |

Primary Examiner—Patrick R. Salce

Attorney, Agent, or Firm—Robert A. Cahill; Walter C. Bernkopf; Philip L. Schlamp

[57] ABSTRACT

The secondary currents of plural current transformers are applied to a full-wave rectifying network for developing an overcurrent signal and a ground fault current signal; the latter flowing in a circuit path embraced by the toroidal core of a miniature current transformer. A transformed ground fault current signal appearing in the multi-turn secondary winding thereof is applied to a ground fault trip mode network operating to measure the signal magnitude against an adjustably established, continuous ground fault trip-time curve including a vertical pick-up curve portion and a sloping inverse time ($I^2t$) delay portion which terminates in a selected one of plural horizontal, fixed time delay portions pursuant to issuing an appropriately delayed ground fault trip signal. Provisions for zone selective interlocking between upstream and downstream breakers are also described.

18 Claims, 7 Drawing Figures

GROUND FAULT TRIP MODE NETWORK FOR STATIC TRIP CIRCUIT BREAKERS

BACKGROUND OF THE INVENTION

The present invention relates to so-called "static trip" industrial circuit breakers, and particularly to a circuit breaker static trip unit equipped to provide ground fault protection as well as overcurrent protection for a distribution circuit.

To sense a ground fault condition, one approach is to compare the total current flowing in the distribution circuit from the source to the load with the total current returning from the load to the source. A ground fault exists if an imbalance or inequality in these currents is found, since some of the current leaving the source is then flowing through the ground fault and returning to the source via an extraneous ground circuit path and the ground return conductor connecting the source to ground. One way of detecting this current imbalance is to link the distribution circuit conductors with a differential current transformer core and look for a current induced in a secondary winding thereof by residual flux flowing in the core. An alternative approach to detecting this current imbalance is to connect the secondary windings of individual phase current transformers and a neutral current transformer, if a neutral conductor is present, into a summing circuit. If the vectorial summation of the secondary currents is zero, no ground fault conditions exist. However, if the vectorial summation of these secondary currents is not zero, then a ground fault condition is indicated. The differential secondary current is then sensed to develop a ground fault signal for processing pursuant to initiating a ground fault trip function.

As an alternative approach to ground fault sensing, rather than looking for an imbalance in the currents flowing to and from the circuit loads in order to indirectly monitor the matnitude of any ground fault current, the magnitude of the ground fault current may be sensed directly by coupling a current transformer with the source ground return conductor. The ground fault signal appearing in the secondary of this current transformer is then processed pursuant to initiating a ground fault trip function.

It is accordingly an object of the present invention to provide an improved circuit breaker static trip unit having both overcurrent and ground fault tripping capabilities.

Another object is to provide an improved ground fault trip mode network for incorporation in an overcurrent static trip unit utilized in industrial circuit breakers.

An additional object of the present invention is to provide a ground fault trip mode network utilizing a miniature current transformer to sense ground fault occasioned differential current flowing in the input section of an overcurrent static trip unit.

Yet another object is to provide a ground fault trip mode network of the above character which is capable of providing time-current response characteristics conducive to improved coordination with the response characteristics of circuit protective devices upstream and downstream thereof.

A further object is to provide a ground fault trip mode network of the above character, which is equipped to accommodate zone selective interlocking with upstream and downstream circuit protective devices.

A still further object is to provide a ground fault trip mode network of the above character which is capable of stand-alone application in ground fault protective devices and systems independently of an overcurrent protective device.

An additional object of the present invention is to provide a ground fault trip mode network of the above character which is efficient in construction, reliable in operation, and versatile in application.

Other objects of the invention will in part be obvious and in part appear hereinafter.

SUMMARY OF THE INVENTION

In accordance with the present invention, there is provided an improved ground fault trip mode network having application in overcurrent static trip units in industrial circuit breakers, as well as stand-alone application in ground fault protective relays. In accordance with a unique feature of the present invention, ground fault occasioned current signals develop either (1) in the secondary of a single zero sequence differential current transformer linked with the current carrying conductors of the distribution circuit or (2) in a network resolving the vectorial summation of the secondary currents of plural current transformers individually linked with current carrying conductors or (3) in the secondary of a current transformer linked with the ground return conductor of the distribution circuit source or (4) in a current limiting branch circuit shunting a grounding resistor connecting the source to ground are sensed by a miniature current transformer whose secondary is connected as the input to the ground fault trip mode network. This inductive coupling of ground fault signals into the ground fault trip network contributes to a less expensive construction, compact size, less power dissipation, less flux swing in the current transformer cores, improved accuracy of current sensing, improved circuit isolation and low input circuit impedance. These factors also render the ground fault trip mode network highly conducive to stand-alone application in ground fault relays.

As an additional feature of the present invention, the ground fault trip mode network is capable of adjustably establishing a trip-time curve having a sloping inverse time ($I^2t$) segment terminating in a selected one of plural fixed-time delay segments against which the input ground fault signal is measured pursuant to generating a ground fault trip signal for initiating a circuit breaker trip function. A thus established trip-time curve and particularly its inverse time segment accommodates much improved selective coordination with the ground fault current responses of upstream and downstream protective devices.

In accordance with still another feature of the present invention, the ground fault trip mode network is equipped for zone selective interlocking with similarly equipped upstream and downstream circuit protective devices. Thus, when the magnitude of the ground fault current is sufficient to call for the imposition of a fixed time delay, the ground fault trip mode network signals a ground fault trip mode network in an upstream circuit protective device to switch from a minimum fixed time delay band selected for maximum circuit protection in the event of a ground fault intermediate the upstream and downstream breakers to a selected fixed time delay band of greater duration. The downstream circuit protective device can then act first to clear the downstream ground fault, leaving the upstream circuit protective device to feed the remaining, sound portion of the distribution circuit.

The invention accordingly comprises the features of construction, combination of elements and arrangement of parts which will be exemplified in the construction hereinafter set forth, and the scope of the invention will be indicated in the claims.

For a better understanding of the nature and objects of the present invention, reference should be had to the following detailed description taken in conjunction with the accompanying drawings, in which.

Corresponding reference numerals refer to like parts throughout the several views of the drawing.

DETAILED DESCRIPTION

Figure 1:
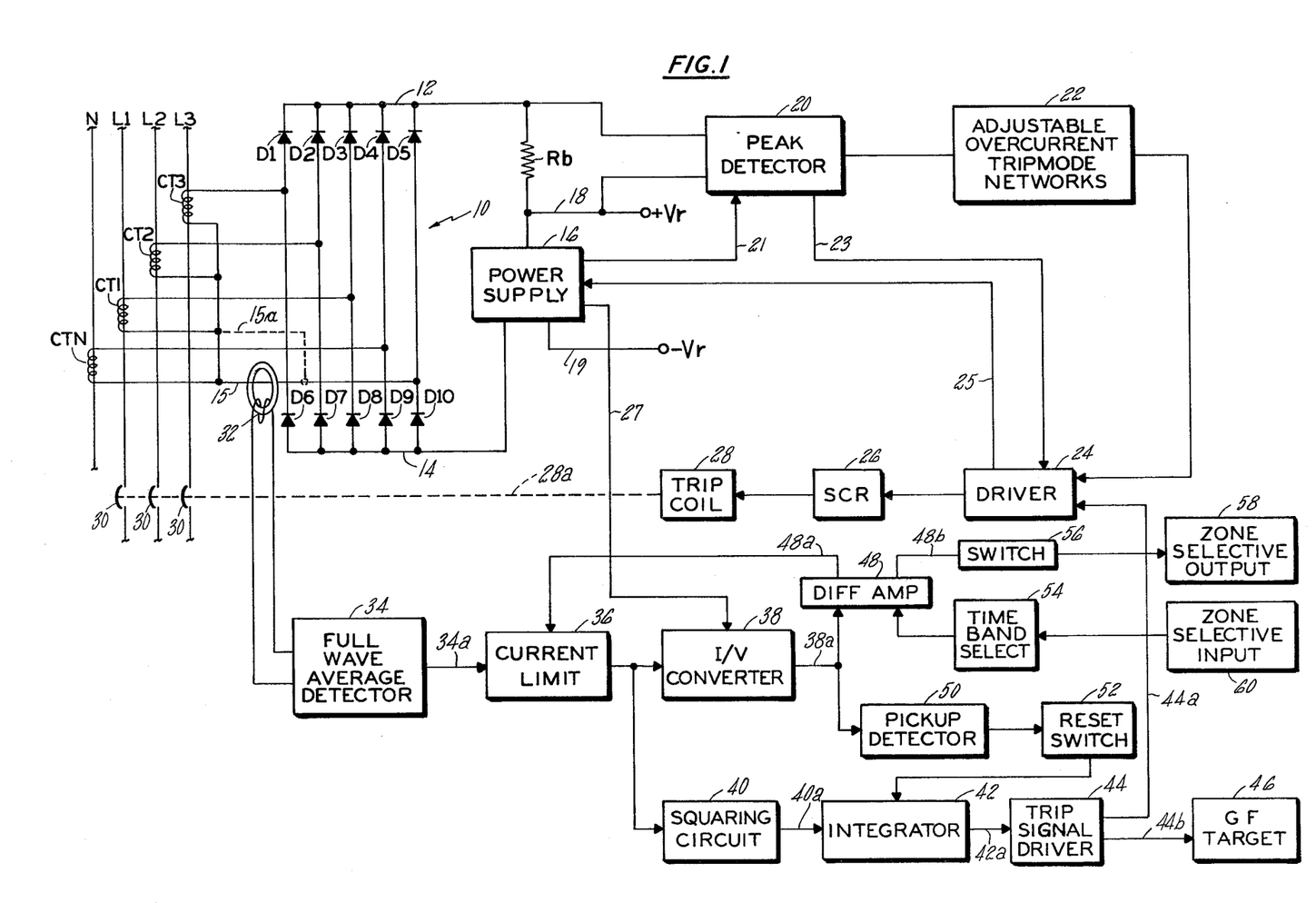
FIG. 1 is a circuit schematic diagram, partially in block form, of a circuit breaker static trip unit incorporating the ground fault trip mode network of the present invention.

Referring first to FIG. 1, a solid state, i.e., static trip, trip unit is disclosed for incorporation in a circuit breaker pursuant to providing overcurrent and ground fault protection for a four-wire power distribution circuit consisting of three line conductors, L1, L2 and L3, plus a neutral conductor N. The currents in the three line conductors and neutral conductor are individually sensed by current transformers CT1, CT2, CT3 and CTN, respectively. The multi-turn secondary windings of these current transformers are connected to a diode rectifying network, generally indicated at 10, which includes diodes D1 through D5, whose cathodes are connected in common to a bus 12, and diodes D6 through D10, whose anodes are connected in common to a bus 14. The anodes of diodes D1 through D5 are respectively connected to the cathodes of diodes D6 through D10. The upper terminal of current transformer CT3 secondary winding is connected to the junction between diodes D1 and D6, the upper terminal of current transformer secondary winding CT2 is connected to the junction between diodes D2 and D7, the upper terminal of current transformer CT1 secondary winding is connected to the junction between diodes D3 and D8, and the upper end of current transformer CTN secondary winding is connected to the junction between diodes D4 and D9. The lower ends of the secondary windings for all of these current transformers are connected in common and thence via a lead of 15 to the junction between diodes D5 and D10.

Positive going full-wave rectified current flows out of the rectifying network onto bus 12 and returns via negative bus 14. The current on bus 12 flows through a burden resistor Rb pursuant to developing a DC signal voltage thereacross of a magnitude proportional to the magnitude of the highest of the phase currents flowing in conductors L1, L2 and L3. A power supply 16, connected between the lower end of burden resistor Rb and bus 14, functions to develop across a bus 18, connected to the lower end of the burden resistor, and a bus 19 a regulated supply voltage Vr. Buses 12 and 18 are also connected as separate inputs to a peak detector 20 which thus responds to the signal voltage developed across burden resistor Rb. It is seen that this signal voltage is super-imposed on the regulated positive supply voltage Vr appearing on bus 18. Peak detector 20 may be of the construction disclosed in my commonly assigned, co-pending application entitled "Fast Recovery Peak Detector", Ser. No. 62,460 filed concurrently herewith. As disclosed therein, the peak detector converts the signal voltage across the burden resistor to a proportionate current signal which is supplied in common to adjustable overcurrent trip mode networks 22. More specifically, these overcurrent trip mode networks may include a separate long-time trip mode network, a short-time trip mode network, and an instantaneous trip mode network. Depending upon the magnitude of the overcurrent represented by the current signal output from peak detector 20, one of these trip mode networks becomes operative to issue a trip signal to a driver circuit 24 which then acts to develop a gate triggering signal for a thyristor, such as an SCR 26. This thyristor then goes into full conduction to draw activating current from power supply 16 through a trip coil 28. The trip coil is mechanically coupled, as diagrammatically indicated at 28a, to circuit breaker contacts 30, such that, actuation of the trip coil is effective to trip the breaker contacts open and thereby interrupt current flow in all three phase conductors of the distribution circuit.

As is disclosed in commonly assigned U.S. Pat. No. 4,121,269, a rectifying network of the construction illustrated for rectifying network 10 herein is capable of resolving the vectorial summation of the secondary currents in current transformers CT1, CT2, CT3 and CTN. If this vectorial summation does not equal zero, manifesting a ground fault on the distribution circuit, a residual or differential current of a magnitude proportional to the magnitude of the ground leakage current is caused to flow on lead 15. To sense this differential current in accordance with the present invention, the toroidal core of a miniature current transformer 32 embraces lead 15 pursuant to developing a secondary current signal proportional to this differential current. This ground fault indicating current signal is supplied to the input of a full-wave average detector circuit 34 operating to develop a full-wave rectified output current signal on lead 34a of a magnitude proportional to the average of the secondary current signal developed by current transformer 32. The full-wave average current signal at the output of detector 34 is supplied through a current limiting circuit 36 for joint application to a current/voltage converter 38 and a current squaring circuit 40. If the magnitude of the ground fault current exceeds the pickup level, a current signal is developed on squaring circuit output lead 40a which is proportional to the square of the ground fault current.

This squared current signal is integrated in an integrator 42 pursuant to developing an output signal voltage on lead 42a which increases with time. When this output voltage rises to a predetermined threshold level, a trip signal driver circuit 44 issues a trip signal on output lead 44a going to the thyristor driver circuit 24 pursuant to initiating a ground fault trip function. Coincidentally with the issuance of this ground fault trip signal, trip signal driver circuit 44 issues an output signal on lead 44b effective in initiating actuation of a ground fault target 46 identifying that the circuit breaker tripped in response to a ground fault condition. For a detailed disclosure of an appropriate ground fault target circuit, reference is made to my commonly assigned, co-pending application entitled "Target Circuit for Circuit Breaker Static Trip Unit", Ser. No. 62,386 filed concurrently herewith.

The current/voltage converter 38 develops a pick-up voltage output signal which is supplied on lead 38a in common to a differential amplifier 48 and a pickup detector 50. It this pickup signal voltage falls below a predetermined level, signifying that the ground fault current has dropped below its pickup level, pickup detector 50 actuates a reset switch 52 operative to reset integrator 42 such as to reduce the magnitude of its voltage output signal. This resetting function serves to prevent nuisance ground fault tripping of the circuit breaker when the sensed ground fault condition is of a momentary or temporary nature.

A second input to differential amplifier 48 is an output voltage developed by a time band select circuit 54. When the voltage signal at the output of converter 38 achieves the time band select circuit output voltage, signifying that the ground fault current magnitude has exceeded a selected fixed-time-band level, differential amplifier 48 generates an output signal on the lead 48a which is fed back to the current limiter 36. In response thereto, the current limiter acts to divert any excess portion of the full-wave average detector output signal current from squaring circuit 40 such that the squaring circuit output current signal is maintained at a limited level. This limited current signal is integrated by integrator 42 pursuant to developing the requisite voltage over a predetermined fixed-time-delay to activate the signal driver circuit 44 pursuant to issuing its trip signal on lead 44a and its target activating signal on lead 44b.

At the same time that differential amplifier issues its output signal on lead 48a to current limiter 36, an output signal appears on its other output lead 48b, conditioning a switch 56 to activate a zone selective interlocking output circuit 58 which then issues an interlock signal for transmission to an upstream breaker. Similarly, a zone selective interlock input circuit 60 responds to an interlock signal from a downstream circuit breaker by conditioning time band select circuit 54 to change its established fixed-time delay band so as to provide a selected fixed time delay of longer duration.

Still referring to FIG. 1, power supply 16, which may be constructed in the manner disclosed in my commonly assigned application entitled "Power Supply for Circuit Breaker Trip Unit" Ser. No. 62,388 filed concurrently herewith, develops an inhibit signal over lead 21 to peak detector 20 acting to disable the peak detector while the power supply is bringing the voltage across buses 18 and 19 up into regulation. While disabled, peak detector 20 in turn disables the thyristor driver circuit 24 over a lead 23. In addition, the power supply disables the current/voltage converter 38 in the ground fault trip mode network over lead 27, again while the supply voltage across regulator buses 18 and 19 is being brought up into regulation. Also, when driver circuit 24 is triggered by a trip signal from either the overcurrent trip mode network or the ground fault trip mode network pursuant to drawing activating current through trip coil 20, the driver circuit 24 sends a current signal over lead 25 back to power supply 16. In response, power supply 16 acts to collapse the voltage across buses 18 and 19, thereby to prevent overdriving of the trip coil.

Figure 2:
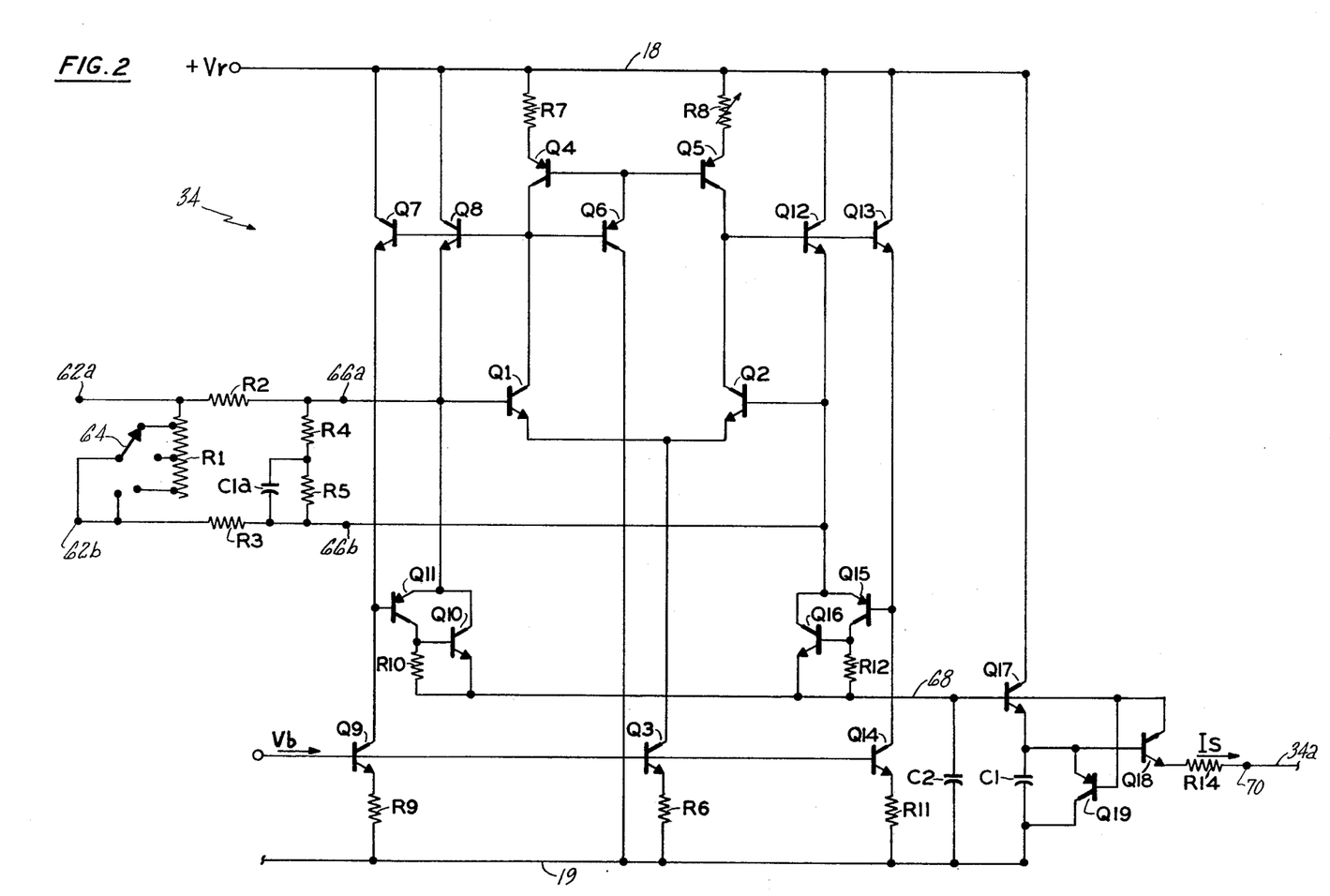
FIG. 2 is a detailed circuit schematic diagram of the full-wave average detector included in the ground fault trip mode network of FIG. 1.

Referring to FIG. 2, the secondary winding of miniature current transformer 32 is connected across input terminal 62a and 62b of full-wave average detector 34. To establish the desired ground fault pickup level, the transformer secondary current signal is selectively attenuated prior to any signal processing. To this end, a selector switch 64 picks off values of resistance from a multiply-tapped resistor R1 for insertion across input terminals 62a, 62b. The selector switch is shown in its position for maximum ground fault current pickup level. To establish the minimum ground fault current pickup level, the selector switch is positioned to switch resistor R1 completely out of the input circuit for detector 34. Adjusting the position of selector switch 64 serves to shift the entire ground fault trip time curve 90 in FIG. 7 horizontally to the left or right.

Input terminal 62a is connected to a terminal 66a, through a resistor R2, while input terminal 62b is connected through a resistor R3 to an input terminal 66b. Terminal 66a is connected to the base of transistor Q1, while terminal 66b is connected to the base of transistor Q2; these transistors being interconnected as an amplifier having a low input impedance. Terminals 66a and 66b are shunted by a pair of series resistors R4 and R5, with the latter resistor shunted by a capacitor C1a. Resistors R2 and R3 provide high frequency buffering, while resistor R4 and capacitor C1a provide high frequency attenuation for amplifier stability. Higher ground fault current pickup levels achieved by switching decreasing values of resistor R1 into the input circuit are effective in bypassing more and more transformer secondary current from the amplifier input, which at the same time decreases the effective burden resistance on the transformer secondary winding. This reduction of burden resistance at higher pickup level settings results in a very wide dynamic operating range for the current transformer 32 of FIG. 1 and the ground fault trip mode network. Resistor R5, in conjunction with resistor R4, provides a limiting value of transformer burden resistance when resistor R1 is switched out of the circuit for its minimum ground fault pickup setting during the time that the trip unit power supply of FIG. 1 is bringing the regulated voltage up to the point where the amplifier becomes active and imposes its low input impedance. This greatly reduces the exponential transient flux in the toroidal core of current transformer 32 resulting from a sudden change in burden resistance as the amplifier becomes active.

The differential amplifier, consisting of transistors Q1 and Q2, monitors the voltage between terminals 66a and 66b and controls a transistor bridge current feedback circuit to maintain the voltage difference between these terminals at a low value. To this end, the emitters of transistors Q1 and Q2 are connected in common through the collector-emitter circuit of a transistor Q3 and a resistor R6 to negative bus 19 of power supply 16 in FIG. 1. An appropriate bias voltage Vb is applied to the base of transistor Q3 pursuant to establishing a current source for the emitter currents of transistors Q1 and Q2. The collector of transistor Q1 is connected through the collector-emitter circuit of the transistor Q4 and a resistor R7 to positive power supply bus 18. Similarly, the collector of transistor Q2 is connected through the collector-emitter circuit and a variable resistor R8 to positive bus 18. The bases of transistors Q4, Q5 are connected through the emitter-collector circuit of a transistor Q6 to negative bus 19. The base of transistor Q6 is connected in common with the bases of transistors Q7 and Q8 to the junction between the collectors of transistors Q4 and Q1. The collectors of transistors Q7 and Q8 are connected to the positive bus, while the emitter of the former is connected through the collector-emitter circuit of a transistor Q9 and a resistor R9 to negative bus 19. Bias voltage Vb is also applied to the base of transistor Q9 so as to establish a current source for the emitter current of transistor Q7. The emitter of transistor Q8 is connected jointly to the base of transistor Q1, the collector of a transistor Q10 and the emitter of a transistor Q11. The base of transistor Q11 is connected to the junction between the emitter of transistor Q7 and the collector of transistor Q9, while its collector is connected to the base of transistor Q10. A resistor R10 is connected in shunt with the base-emitter junction of transistor Q10.

The junction between the collectors of transistors Q5 and Q2 is connected to the bases of transistors Q12 and Q13. The collectors of transistors Q12 and Q13 are both connected to positive bus 18. The emitter of transistor Q13 is connected through the collector-emitter circuit of a transistor Q14 and a resistor R11 to negative bus 19. Bias voltage Vb is applied to the base of transistor Q14 to establish it as a current source for the emitter of transistor Q13. The emitter of transistor Q12 is connected to the base of transistor Q2 and also to the emitter of a transistor Q15 and the collector of a transistor Q16. The base of transistor Q15 is connected to the emitter of transistor Q13, while its collector is connected to the base of transistor Q16. A resistor R12 shunts the base-emitter junction of transistor Q16.

The emitters of transistors Q10 and Q16 are connected with a lead 68 which is brought out to the base of a transistor Q17 and the collector of a transistor Q18. The collector of transistor Q17 is connected to positive bus 18, while its emitter is connected to the base of transistor Q18 and to negative bus 19 through a capacitor C1. Lead 68 is also connected to negative bus 19 by a capacitor C2. Capacitor C1 is shown shunted by the emitter-collector circuit of transistor Q19, whose base is connected to lead 68.

Considering the operation of the full-wave average detector 34 of FIG. 2, with zero differential current flowing in lead 15 of FIG. 1, i.e., zero primary current in transformer 32, resistor R8 in FIG. 2 is adjusted so as to achieve zero voltage between terminals 68a and 68b. In this condition transistors Q8 and Q12 provide the requisite base currents for the differential amplifier transistors Q1 and Q2, and transistors Q11 and Q15 are turned off, resulting in no current flow on lead 68. The non-conduction of transistor Q11 is seen from the fact that the bases of transistors Q7 and Q8 are tied together, resulting in their emitter voltages being equal. Consequently, the base emitter junction of transistor Q11 is not forward biased. Similarly, the emitter voltages of transistors Q12 and Q13 are equal, thus the base emitter junction of transistor Q15 is not forward biased.

When current flows in lead 15 of FIG. 1 manifesting a ground fault condition on the distribution circuit, the secondary current developed in current transformer 32, during one polarity, attempts to drive current into terminal 66b of full-wave average detector 34 and pull current out from terminal 66a. The differential amplifier becomes unbalanced, in that the voltage at the terminal 66b goes more positive than terminal 66a, causing transistor Q2 to conduct more current than transistor Q1. The voltage on the collector of transistor Q2 goes down, shutting off transistor Q12 and pulling the emitter voltage of transistor Q13 downwardly. This action turns on transistor Q15, which then turns on transistor Q16, and thus the secondary current injected into terminal 66b is conducted onto lead 68. At the same time, the base of transistor Q1 and the emitter of transistor Q8 go down in voltage. Transistor Q8 is thus driven further into conduction to draw current from positive bus 18 which flows out from terminal 66a through the secondary winding of current transformer 32 of FIG. 1 to supply the current injected into the full-wave average detector 34 at terminal 66b.

During opposite half cycles when the secondary current of transformer 32 flows into terminal 66a, the conduction of transistor Q1 increases and the conduction of transistor Q2 decreases. The collector voltage of transistor Q2 is pulled up by transistor Q5, and transistor Q12 pulls up the base of transistor Q2 and the emitter voltage of transistors Q2 and Q1, hence the base of Q1 rises causing transistor Q8 to shut off. Transistor Q11 turns on, as does transistor Q10, and the secondary current driven into terminal 66a is routed onto lead 68. The feedback current through transistor Q12 flows out from terminal 66b to supply the secondary current injected into terminal 66a.

From the foregoing description, it is seen that transistors Q8, Q12, Q11 and Q15 constitute a transistor bridge rectifying network functioning to produce on lead 68 a full-wave rectification of the current transformer 32 secondary current. This full-wave rectified secondary current is integrated by capacitor C2, and the voltage developed across this capacitor is peak detected by capacitor C1 through the base emitter junction of transistor Q17. The voltage developed on capacitor C1 is applied to the base of transistor Q18 such as to produce a DC current signal Is flowing through a resistor R14 to output terminal 70 of full-wave average detector 34. This DC current signal is obtained from lead 68 through the collector of transistor Q18, and constitutes the DC discharge current of capacitor C2. It is seen that if the average value of the full-wave rectified secondary current on lead 68 for capacitor C2 exceeds the discharging current Is, the voltage on capacitor C2 will rise, thereby increasing the voltage on capacitor C1 and thence the magnitude of the current signal Is. Conversely, if the full-wave rectified secondary current on lead 68 for charging capacitor C2 is less than its discharge current, i.e., current signal Is, the voltage across capacitor C2 decreases, as does the collector voltage of transistor Q18. The base voltage of transistor Q19 is pulled down until eventually this transistor goes into conduction to discharge capacitor C1 through its emitter-collector circuit. The consequent reduction in the voltage on capacitor C1 reduces the magnitude of current signal Is. If the circuitry disclosed in FIG. 2 for the full-wave average detector 34 is implemented in integrated circuit form, transistor Q19 may be omitted. The requisite discharging of capacitor C1 is then achieved when the collector voltage of transistor Q18 is pulled down by the decreasing voltage on capacitor C2 to the point where this transistor saturates. At this point, capacitor C1 can then discharge to substrate through the parasitic PNP junctions associated with transistor Q18 pursuant to effecting a decrease in the magnitude of current signal Is. The value of capacitor C1 is chosen such that the transistor Q18 base current produces less than a 1 percent ripple on the base voltage, and adds a correspondingly low ripple factor in the DC output current Is. On the other hand, the value of capacitor C2 is chosen to produce a relatively large ripple voltage on the base of transistor Q17 and the collector of transistor Q18. Thus, a decrease in the secondary current transformer 32 results in a decrease in the output current signal Is within a short period of time.

Figure 3:
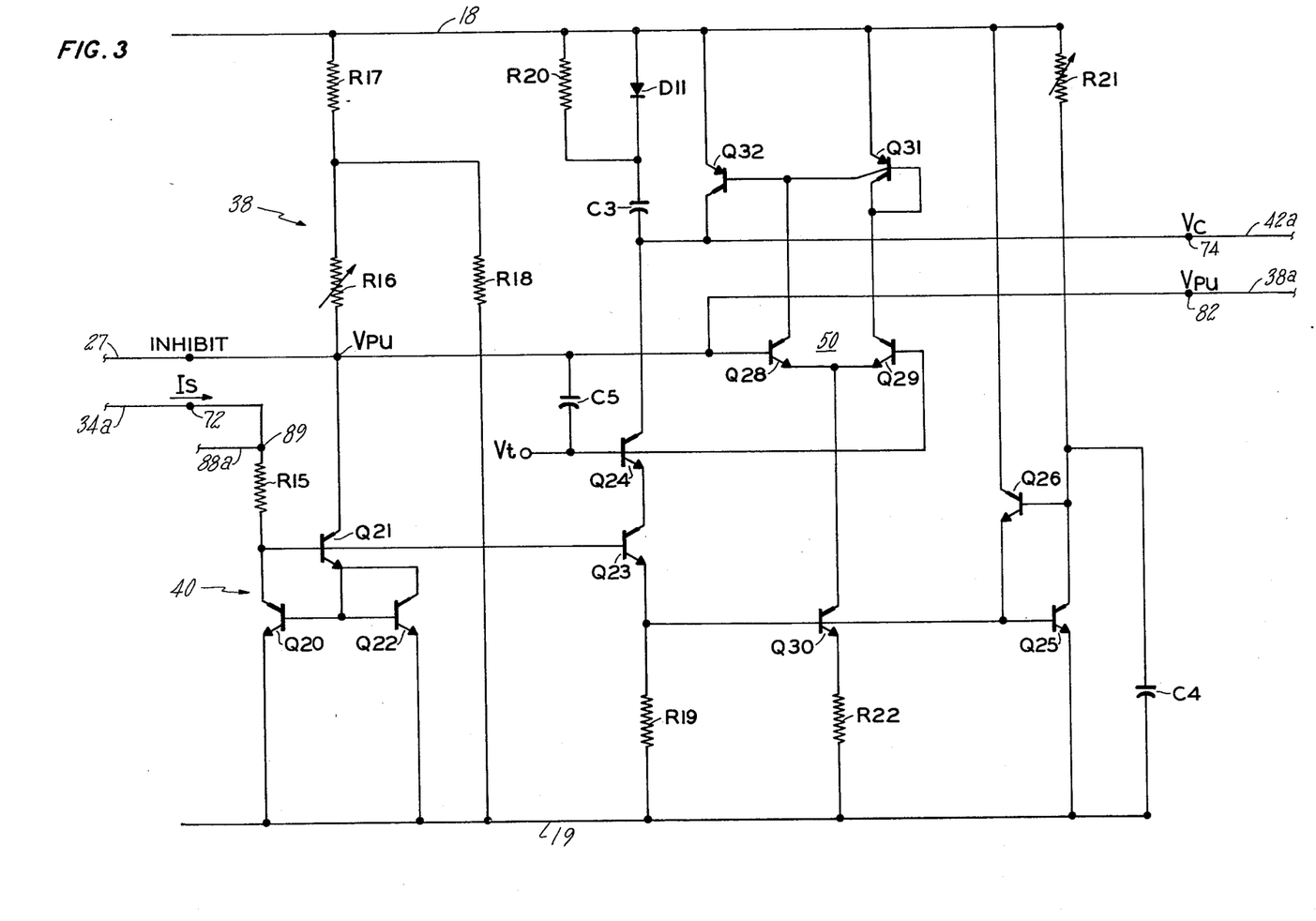
FIG. 3 is a detailed circuit schematic diagram of the current/voltage converter, squaring circuit, pick-up detector, ground fault integrator and reset switch included in the ground fault trip mode network of FIG. 1.

The current signal Is appearing at output terminal 70 of full-wave average detector 34 is applied via lead 34a to an input terminal 72 of squaring circuit 40 shown generally in FIG. 1 and detailed in FIG. 3. This current signal flows through a resistor R15 and the collector-emitter circuit of transistor Q20 to negative bus 19. The collector of transistor Q20 is connected to the base of a transistor Q21, while its base is connected in common with the base of a transistor Q22. The collector and base of transistor Q22 are commonly connected with the emitter of collector Q21, while the emitter of transistor Q22 is connected to negative bus 19. The collector of transistor Q21 is connected to positive bus 18 through a voltage divider, consisting of resistors R16 and R17. The junction between resistors R16 and R17 is connected to the negative bus through a resistor R18. As will be seen, resistors R16 through R18 constitute the current/voltage converter 38 generally disclosed in FIG. 1.

The transistors Q20 through Q22 are seen to be interconnected as a current mirror, such that the current signal Is flowing into input terminal 72 is replicated by the collector current of transistor Q21 flowing through resistors R16 and R17 of current/voltage converter 38. The collector of transistor Q20 is also connected to the base of a transistor Q23, whose emitter is connected through a resistor R19 through negative bus 19. The collector of transistor Q23 is connected to positive bus 18 through a diode D1, a capacitor C3, and the collector-emitter circuit of a transistor Q24. A resistor R20 is connected in shunt with diode D1. The emitter of transistor Q23 is also connected to the base of a transistor Q25 and to the emitter of a transistor Q26. The collector of transistor Q26 is directly connected to the positive bus 18, while the emitter of transistor Q25 is directly connected to negative bus 19. The collector of transistor Q25 and base of transistor Q26 are connected in common through a resistor R21 to positive bus 18. A capacitor C4 shunts the collector-emitter circuit of transistor Q25.

Transistors Q20, Q21, Q22, Q23, Q25 and Q26, and their associated circuitry constitute a true logarithmic squaring circuit whose operation is predicated on the fundamental characteristics of a diode or transistor, specifically the base emitter junction of a transistor, in that the voltage developed across a base-emitter transistor junction is proportional to the natural logarithm of the current flowing through that junction. Conversely, the current through a junction is exponentially related to, i.e., the anti-log, of the voltage across the junction. Thus, the current signal Is at input terminal 72 flows through transistor Q20 causing an equal current to flow through the base emitter junctions of transistors Q21 and Q22, thereby creating base-emitter voltages in each of these transistors corresponding to the logarithm of the current signal magnitude. The sum of these two base emitter voltages, corresponding to the logarithm of the square of the current signal IS, is applied to the base of transistor Q23. A bias current drawn from positive bus 18 through resistor R21 flows into the base of transistor Q26 and the collector of transistor Q25 such as to produce a fixed voltage corresponding to the logarithm of the bias current at the base of transistor Q25 which is applied to the emitter of transistor Q23. It is thus seen that the resulting base-emitter voltage on transistor Q23 is equal to the base-emitter voltage of transistor Q21 plus the base emitter voltage of transistor Q22 minus the fixed voltage developed at the base of transistor Q25. It can be readily shown mathematically that the collector current thus produced in transistor Q23 is proportional to the anti-log of its base emitter voltage, and hence is equal to the square of the signal current Is divided by the bias current flowing through resistor R21. As seen in FIG. 3, the collector current of transistor Q23 is utilized to charge integrating capacitor C3, and thus the voltage developed across this capacitor is a function of the time integral of the square of the current signal Is. Resistor R21 is shown to be a variable resistor to indicate that it may be functionally trimmed in order to tailor the bias current and thus produce a precise timing at a given current signal magnitude, hence to obtain a desired limit on the integration of the current signal squared.

Still referring to FIG. 3, the voltage appearing at the lower end of resistor R16, as produced by the current signal Is replicated on the collector of transistor Q21, is applied to the base of a transistor Q28. This transistor is connected with a transistor Q29 as a differential comparator, which functions as the pickup detector 50 as seen generally in FIG. 1. A comparator reference voltage Vt is applied to the base of transistor Q29, as well as the base of transistor Q24. The emitters of transistors Q28 and Q29 are connected in common through the collector-emitter circuit of transistor Q30 and a resistor R22 to negative bus 19. The base of transistor Q30 is connected with the base of transistor Q25 such as to establish the former as an emitter current source for the differential comparator transistors Q28, Q29. The collector currents for transistors Q28 and Q29 are obtained from a dual collector transistor Q31, whose emitter is connected to the positive bus and base is connected with the collector of transistor Q29. Diode D1 and integrating capacitor C3 are shunted by the emitter-collector circuit of a transistor Q32, whose base is connected with the collector of transistor Q28.

Still referring to FIG. 3, with no current in the secondary of current transformer 32 (FIG. 1) and thus zero current signal Is at the output of full-wave average detector 34, resistors R17 and R18 are selected such as to establish a voltage at the upper end of resistor R16 which is, for example, 2 volts above the differential comparator reference voltage Vt. For a signal current Is equal to the desired pick-up level, the resistor R16 is adjusted such that the voltage at its lower end, which is applied to the base of transistor Q28, is equal to the reference voltage Vt applied to the base of transistor Q29. When the signal current Is is below the pick-up threshold level, transistor Q28 is conducting the total emitter current for current source transistor Q30. Transistor Q32 thus becomes saturated to shunt charging current from integrating capacitor C3. When the signal current exceeds the pick-up level, the voltage at the base of transistor Q28 drops below the differential comparator reference voltage Vt, transistor Q29 turns on, causing transistor Q31 to saturate. Transistor Q32 is thus turned off to enable charging current to flow through integrating capacitor C3. As previously described, the integrating capacitor charging current produced by transistor Q23 is equal to the square of the current signal divided by the bias current supplied by resistor R21; the latter being trimmed via adjustment of resistor R21 to produce the desired charging current to signal current relationship. Buffer transistor Q24 holds the collector of transistor Q23 at a fixed voltage (one base-emitter voltage drop down from the differential comparator threshold voltage Vt) in order to maintain linearity of charging current independent of voltage on the integrating capacitor. Should the signal current then drop below the threshold level, transistor Q28 turns on to saturate transistor Q32, and integrating capacitor C3 discharges through resistor R20 and the emitter-collector circuit of transistor Q32. Thus transistor Q32 constitutes reset switch 52 in FIG. 1.

A capacitor C5, connected across the bases of differential comparator transistors Q28 and Q29, provides a bypass for ripple and high frequency noise appearing in the reference voltage and in the replicated current signal flowing through resistor R16 and the collector of transistor Q21. Capacitor C4 provides filtering for the fixed voltage developed at the base of transistor Q25. The junction between resistor R16 and the base of transistor Q28 is also connected via lead 27 back to the trip unit power supply 16, as seen in FIG. 1, to enable the power supply to inhibit spurious operation of pick-up comparator 50 while the power supply is acting to bring the voltage across buses 18 and 19 into substantial regulation.

Figure 4:
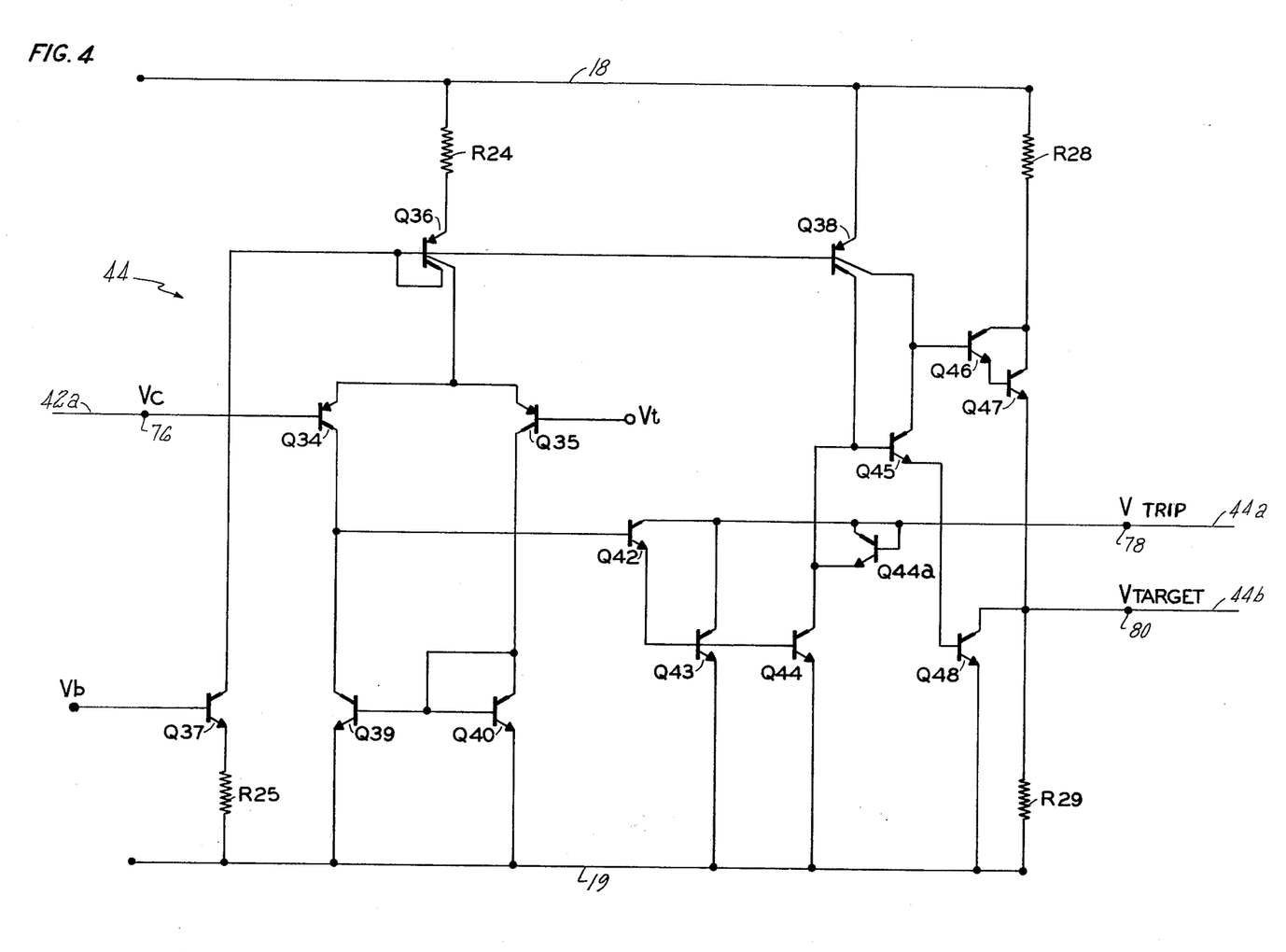
FIG. 4 is a detailed circuit schematic diagram of the trip signal driver included in the ground fault trip mode network of FIG. 1.

As integrating capacitor C3 is being charged at a rate proportional to the square of the signal current, the voltage appearing at its lower terminal is brought out to output terminal 74 seen in FIG. 3 for application via lead 42a to the trip signal driver circuit 44 generally disclosed in FIG. 1 and detailed in FIG. 4. This capacitor integrating voltage Vc appears on input terminal 76 for application to the base of a transistor Q34, which is connected with transistor Q35 as a differential comparator. Comparator reference voltage Vt is applied to the base of transistor Q35. Emitter current for the differential comparator transistors Q34 and Q35 is obtained from one collector of a dual collector transistor Q36, whose emitter is connected through a resistor Q24 to positive bus 18. The other collector of this dual collector transistor is connected in common with its base and thence through the collector-emitter circuit of a transistor Q37 and a resistor R25 to negative bus 19. An appropriate bias voltage is applied to the base of transistor Q37 such as to establish this transistor as an appropriate base drive current source for transistor Q36 as well as a second dual collector transistor Q38. The collector of transistor Q34 is connected through the collector-emitter circuit of a transistor Q39 to negative bus 19, while the collector of transistor Q35 is connected to the collector-emitter circuit of a transistor Q40 to the negative bus. The base and collector of transistor Q40 are connected in common and also to the base of transistor Q39.

When integrating capacitor C3 in FIG. 3 is discharged prior to the application of charging current thereto, the voltage at its lower terminal brought out to output terminal 74 is essentially at the positive supply voltage on bus 18. When a secondary current exceeding the pick-up level is developed in current transformer 32, integrating capacitor C3 begins charging in the manner described, and the voltage Vc falls linearly toward the negative voltage on bus 19. Until this voltage falls into equality with the comparator reference voltage Vt, transistor Q34 is non-conducting, transistors Q35 and Q40 are conducting, and transistor Q39 is saturated. When the integrating capacitor voltage Vc becomes less than the comparator reference voltage Vt, the differential comparator changes, such that transistor Q34 becomes conductive and transistor Q35 turns off. Transistor Q39 is pulled out of saturation, and thus the collector current of transistor Q34 is available as base drive current for a transistor Q42. The collector of this transistor is brought out to a terminal 78 to which trip driver circuit output lead 44a seen in FIG. 1 running to thyristor driver circuit 24 is connected. The emitter of transistor 42 is connected to drive the bases of transistors Q43 and Q44, whose emitters are connected to negative bus 19. The collector of transistor Q43 is connected in common with the collector of transistor Q42, while the collector of transistor Q44 is connected to the base of a transistor Q45 and one collector of the dual collector transistor Q38. The emitter of transistor Q38 is connected to the positive bus 18, while its base is connected with bias current source transistor Q37. The collector of transistor Q45 is connected with the other collector of transistor Q38 and to the base of a transistor Q46, connected with transistor Q47 as a Darlington pair. The collectors of this Darlington pair are connected in common and through a resistor R28 to positive bus 18. The emitter of transistor Q46 is connected to the base of transistor Q47, while the emitter of the latter is connected to the negative bus through a resistor R29, which is shunted by the collector-emitter circuit of a transistor Q48. The base of transistor Q48 is connected with the emitter of transistor Q45.

As is disclosed in greater detail in my above-mentioned co-pending application entitled "Target Circuit for Circuit Breaker Static Trip Unit", a trip signal issued over lead 44a to precipitate a ground fault trip function is manifested by an abrupt reduction in the voltage on lead 44a from a quiescent two base-emitter voltage drop above negative bus 19 down to one base-emitter voltage drop up from the negative bus. To this end, until transistor Q42 is driven into conduction by operation of the differential comparator transistor Q34, Q35, transistors Q43 and Q44 are turned off. Base drive current for transistor Q45 is provided from one of the collectors of transistor Q38, and this former transistor turns on to shunt base drive current available on the other collector of transistor Q38 from the base of transistor Q46. The emitter current from transistor Q45 turns on transistor Q48 to effectively clamp its collector to the negative bus 19. The collector of transistor Q48 is brought out to an output terminal 80 to which is connected lead 44b running to ground fault target circuit 46, seen generally in FIG. 1. Under these circumstances, as disclosed in my co-pending application, the clamping of terminal 80 to the negative bus by the conduction of transistor Q48 inhibits the development of a gate voltage across resistor R29 required to trigger the ground fault target thyristor into conduction pursuant to effecting ground fault target actuation. Moreover, since transistors Q46 and Q47 are turned off by the conduction of transistor Q45, no current can flow through resistor R29 pursuant to developing the target thyristor gate triggering voltage.

When a ground fault trip function is to be executed, the base drive current applied to transistor Q42 by operation of differential comparator transistor pair Q34, Q35 turns on this transistor, as well as transistors Q43 and Q44. The collector voltage of transistor Q43 is pulled down to the voltage on its base, i.e., one base emitter voltage drop up from negative bus 19. Since the collector of transistor Q43 is connected in common with the collector of transistor Q42 and output terminal 78, it is seen that the collector of transistor Q43 pulls the voltage at output terminal 78 down from its normal two base-emitter drop up from the negative bus to one base-emitter voltage drop up from the negative bus. This constitutes a trip signal issuing from trip signal driver circuit 44 of the ground fault trip mode network effective in precipitating a ground fault trip function.

In addition, the conduction of transistor Q44 diverts base drive current from transistor Q45, which turns off to cease diverting base drive current from Darlington transistor pair Q46, Q47 and to cease supplying base drive current for transistor Q48. Transistor Q48 goes non-conductive to remove its clamp on output terminal 80 and lead 44b. At the same time, the conduction of transistors Q46 and Q47 draws current through resistors R28 and R29 pursuant to developing across the latter the requisite gate triggering voltage to trigger the ground fault target thyristor into conduction. The consequent actuation of the ground fault target indicates that the circuit breaker has been tripped in response to a ground fault condition on the distribution circuit. Diode-connected transistor Q44a is utilized to prevent transistor Q44 from saturating until the voltage at output terminal 78 has been decreased sufficiently to produce the requisite trip signal.

Figure 5:
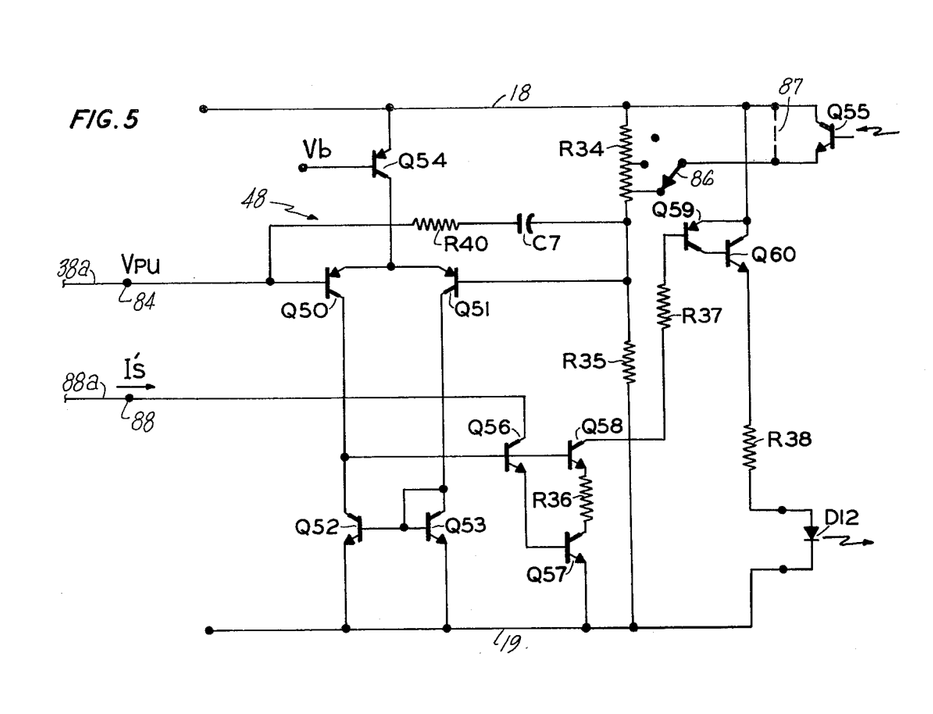
FIG. 5 is a detailed circuit schematic diagram of the current limiter, differential amplifier, time band select circuit and zone selective input and output circuits included in the ground fault trip mode network of FIG. 1.

From FIG. 1, it is seen that the voltage output from current/voltage converter 38, in addition to being applied to pick-up detector 50 of FIG. 3, is also applied to differential amplifier 48 seen generally in FIG. 1 and disclosed in detail in FIG. 5. To this end, the pick-up signal voltage Vpu appearing at the junction of variable resistor R16 and the base of transistor Q28 in FIG. 3 is brought out to output terminal 82 which is connected via lead 38a to input terminal 84 of differential amplifier 48, consisting of transistors Q50 and Q51 as seen in FIG. 5. As will be seen from the description to follow, differential amplifier 48 becomes operative at high levels of ground fault current to condition the ground fault trip network such that it ceases following the sloping $I^2t$ portion 90b of trip time curve 90 seen in FIG. 7 and branches off into a selected one of three fixed-time delay bands 90c, 90d and 90e. This is accomplished by measuring the current signal produced pick-up voltage at the output of the current/voltage converter 38, i.e., output terminal 82 in FIG. 3, and if this voltage is found to be equal to or less than a selected one of three fixed-time-band voltages, differential amplifier 48 conditions current limiter 36 in FIG. 1 to begin shunting any excess signal current from squaring circuit 40. In fact, differential amplifier 48 controls the current limiter in a manner such that the current signal supplied to the squaring circuit cannot exceed the selected level. The squaring circuit, in turn, develops a limited charging current for integrating capacitor C3 in FIG. 3, and the capacitor voltage Vc supplied to trip signal driver circuit 44 of FIG. 4 falls linearly into equality with the differential comparator reference voltage Vt, such as to produce a fixed time delay corresponding to the selected one of the fixed time delay bands 90c, 90d, 90e in FIG. 7 before the issuance of a ground fault trip signal at output terminal 78 of the trip signal driver circuit.

Figure 6:
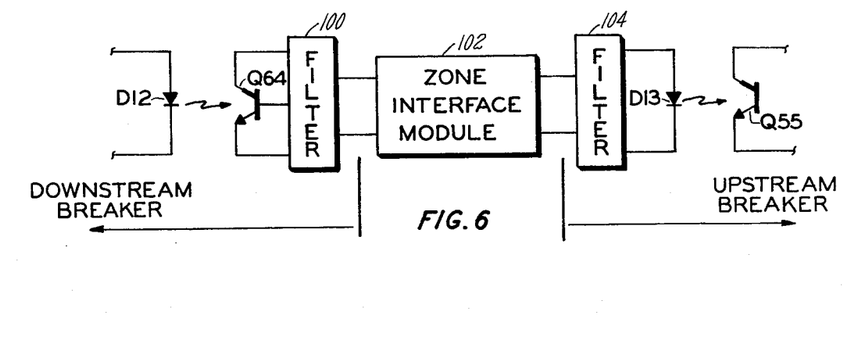
FIG. 6 is a block diagram of the zone selective interlocking signal coupling between upstream and downstream circuit protective devices.
Figure 7:
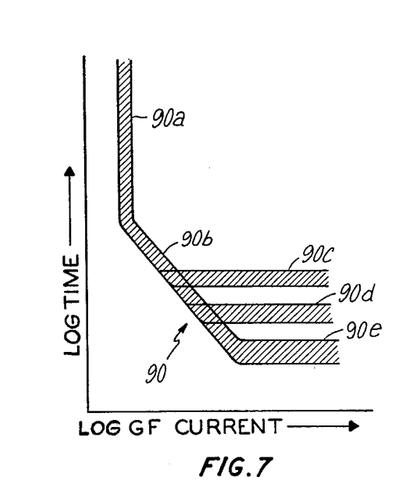
FIG. 7 are representative trip time curves for the ground fault trip mode network of FIG. 1.

To this end, input terminal 84 of differential amplifier 48 in FIG. 5 is connected to the base of the transistor Q50, whose collector is connected through the collector-emitter circuit of a transistor 52 to negative bus 19. The collector of transistor Q51 is connected through the collector-emitter circuit of a transistor Q53 to negative bus 19. The collector and base of transistor Q53 are connected in common with the base of transistor Q52. The common emitters of transistors Q50 and Q51 are connected through the collector-emitter circuit of a transistor Q54 to positive bus 18. The base of transistor Q54 is connected to a suitable source of bias voltage, which may be the base of transistor Q36 in FIG. 4. The base of transistor Q51 is connected to the junction between a resistor R34 and a resistor R35, connected in series between buses 18 and 19. Resistor R34 is provided with a pair of taps brought out to contacts of a selector switch 86, whose wiper is connected to positive bus 18 through the collector-emitter circuit of a photo-transistor Q55. As will be seen, photo-transistor Q55 is utilized to accommodate zone selective interlocking with a downstream circuit breaker, as will be described in connection with FIG. 6. If zone selective interlocking is not to be provided, the wiper of selector switch 86 is connected directly to bus 18 by a jumper 86, indicated in phantom. It is seen that the wiper of selector switch 86 is positioned to its various contacts to select different values of resistance for insertion into the voltage divider, thereby selecting one of the three fixed-time delay bands seen in FIG. 7. With selector switch 86 in its position shown in FIG. 5, and assuming jumper 87 in place or transistor Q55 rendered conductive in response to a photo-signal, the maximum fixed-time-delay band 90c in FIG. 7 is selected. For the intermediate position of selector switch 86, effective in switching more resistance into the voltage divider, the intermediate fixed-time-delay band 90d of FIG. 7 is selected. If the selector switch wiper is positioned at its blank contact or if jumper 87 is open and transistor Q55 is non-conductive, the full resistance value of resistor R34 is inserted into the voltage divider, and the minimum fixed-time-delay band 90c is selected.

As long as the signal voltage at the output of current/voltage converter 38, developed at output terminal 74 in FIG. 3 is greater than the fixed-time-band voltage applied to the base of transistor Q51, as selected by selector switch 86, transistor Q50 is turned off, while transistor Q51 of differential amplifier 48 is conducting all of the emitter current supplied by current source transistor Q54. If the magnitude of the ground fault current is sufficient to reduce the signal voltage output from the converter 38 into equality with the voltage at the base of transistor Q51, transistor Q50 goes into conduction, and its collector current provides base drive current for transistors Q56, Q57 and Q58. The collector of transistor Q56 is brought out to a terminal 88 which is connected via a lead 88a back to a terminal 89 in FIG. 3, which is seen to be common with input terminal 72 of squaring circuit 40 into which the current signal Is from the full-wave average detector 34 is injected over lead 34a. With the conduction of transistor Q56 in FIG. 5, it is seen that a portion of the current signal Is, indicated at Is', is shunted from squaring circuit 40 through the collector-emitter circuit of transistor Q56 and the base emitter junction of transistor Q57. Differential amplifier 48 controls the conduction of transistor Q56 such that sufficient current signal Is' is diverted from squaring circuit 40 such as to maintain the remaining current signal portion supplied to the squaring circuit and replicated in the collector of transistor Q21 in FIG. 3 at a fixed level necessary to maintain the voltage signal at the output of converter 38 equal to the voltage established by selector switch 86, regardless of any higher magnitude of the current signal appearing at the output of full-wave average detector 34. This constant replicated current signal is squared by the squaring circuit 40 to develop a limited charging current for integrating capacitor C3 in FIG. 3, and this capacitor charges linearly toward the trip threshold voltage established by differential comparator transistors Q34, Q35 in FIG. 4 pursuant to the fixed time delay adjustably established by selector switch 86 in FIG. 5.

The emitter of transistor Q58, as seen in FIG. 5, is connected through a resistor R36 to the collector of transistor Q57, while the collector of the former is connected through a resistor R37 to the base of a transistor Q59 connected with transistor Q60. The emitter of transistor Q59 and collector of transistor Q60 are connected in common to positive bus 18, while the emitter of transistor Q60 is connected through a current limiting resistor R38 and a light emitting diode D12 to negative bus 19. It is thus seen that when the signal voltage Vpu at the output of converter 38 falls into equality with the voltage selected by selector switch 86, transistor Q56 goes into conduction to divert any excess signal current from the squaring circuit, as previously described, and transistor Q58 then also goes into conduction to drive the transistor pair Q59 and Q60 into conduction, thereby supplying current to activate light emitting diode D12. As will be seen in connection with FIG. 6, the light signal issued by this light emitting diode is utilized to provide zone selective interlocking with an upstream circuit breaker. A capacitor C7 and a resistor R40 connected in series between the bases of differential amplifier transistors Q50, Q51 provide high frequency filtering and compensation for the amplifier.

As seen from the foregoing description, when the ground fault current sensed by a downstream breaker exceeds the fixed-time-band level selected by its selector switch 86, differential amplifier 48 conditions the current limiter 34 (transistor Q56 in FIG. 5) to limit the current signal Is applied to squaring circuit 40. The sloping $I^2t$ portion 90b of the trip time curve in FIG. 7 is thus truncated into one of the fixed-time bands 90c, 90d, 90e, corresponding to the setting of selector switch 86, thereby establishing a fixed-time delay before issuing a ground fault trip signal. As was described in connection with FIG. 5, while the selected, fixed-time-delay is being timed out, light emitting diode D12 is being energized causing the issuance of an optical signal. As seen in FIG. 6, this light emitting diode is included in an optical coupler such that its optical signal activates a photo-transistor Q64. This photo-transistor goes into conduction to act as the source of a current signal which is filtered by a filter network 100 and fed to a zone interface module 102. This current signal is amplified in module 102 and fed to a filter 104 pursuant to activating a light emitting diode D13. This light emitting diode is included in an optical coupler such that the optical signal emitted thereby activates photo-transistor Q55 included in an upstream circuit breaker and electrically connected in the manner shown in FIG. 5. It is thus seen that when photo-transistor Q55 goes into conduction in response to the receipt of an optical signal from light emitting diode D13 in FIG. 6, the wiper of selector switch 86 in FIG. 5 is thereby connected directly to positive bus 18. Prior to the conduction of this photo-transistor, it is seen that the full resistance value of resistor R35 is included in the voltage divider establishing the voltage applied to the base of transistor Q51 in differential amplifier 48. Under these circumstances, the minimum fixed-time band 90e in FIG. 7 is established. When transistor Q55 is rendered conductive in response to a zone selective interlock signal issued by the light emitting diode D12 in the downstream breaker, thereby signalling that the downstream breaker is in the process of timing out the fixed-time-delay established by its selector switch 86, the selector switch wiper 86 on the upstream breaker is connected to the positive bus. If the wiper is in its position shown in FIG. 5, the minimum value of resistance for resistor R34 is switched into the voltage divider, thereby establishing the maximum fixed-time band 90c for the upstream breaker. Under these circumstances, the downstream breaker is afforded sufficient time to clear the ground fault condition leaving the upstream breaker untripped.

It will be appreciated that the miniature current transformer 32 in FIG. 1 may have its primary connected in circuit with the secondary winding of a single zero sequence (differential) current transformer whose core embraces all of the distribution circuit conductors pursuant to providing in its secondary a ground fault indicating signal. Alternatively, the miniature current transformer primary may be connected in the secondary of a current transformer whose core embraces the ground return conductor connecting the ground return conductor connecting the distribution circuit source to ground. In these two configurations, the common lower terminals of the phase current transformer secondary windings are connected into rectifying network 10 via a jumper 15a, as seen in FIG. 1. As a still further option, the toroidal core of current transformer 32 may be inductively coupled with a branch circuit including a current limiting resistor and connected in shunt with a grounding resistor connecting the source to ground. It is thus seen that the utilization of this inductive pick-up of ground fault manifesting current afforded by this miniature current transformer contributes significantly to the versatility of the ground fault trip mode network of the present invention, including its stand-alone application in ground fault relays.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A ground fault trip mode network operative to trip a circuit interrupting device in the event of a ground fault on an AC power distribution circuit, said network comprising, in combination:
  A. means for deriving a first AC ground fault current signal proportional to ground fault current flowing from the power distribution circuit;
  B. a rectifying average detector connected with said deriving means for developing a second DC current signal of a magnitude proportional to average amplitude of the rectified first current signal;

C. a converter connected with said average detector for developing a first DC voltage signal proportional to said second current signal;
D. a squaring circuit connected with said average detector for developing a third current signal proportional to said second current signal;
E. a pickup detector connected with said converter for monitoring said first voltage signal with respect to a first voltage reference;
F. an integrator connected with said squaring circuit to integrate said third current and thus develop a second voltage signal whose magnitude varies with time, said integrator being enabled by said pickup detector to integrate said third current signal while said first voltage signal exceeds said first voltage reference in one sense and disabled by said pickup detector while said first voltage signal exceeds said first reference voltage in the opposite sense; and
G. a trip signal driver connected with said integrator to generate a trip signal initiating tripping of the interrupting device when said second voltage signal achieves a predetermined magnitude.

2. The ground fault trip mode network defined in claim 1, wherein said rectifying average detector includes a full-wave rectifying bridge for rectifying said first current signal.

3. The ground fault trip mode network defined in claim 1, which further includes:
A. a fixed-time delay pickup detector connected with said converter for monitoring said first voltage signal with respect to a pre-selected one of plural second voltage references of different magnitudes; and
B. a current limiter connected intermediate said average detector and said integrator and controlled by said fixed-time delay pickup detector when said first voltage signal achieves equality with said pre-selected second voltage reference to limit said second current supplied to said squaring circuit to a fixed magnitude as determined by the magnitude of said pre-selected one of said second voltage references.

4. The ground fault trip mode network defined in claim 3, wherein said current limiter is also connected intermediate said average detector and said converter, and is controlled by said fixed-time delay pickup detector to shunt signal current from said converter and integrator, said fixed-time pickup detector including a differential amplifier to which said first voltage signal and said pre-selected second voltage reference are applied as separate inputs, the output of said amplifier controlling said current limiter to shunt sufficient signal current from said second current signal as developed by said average detector such as to maintain a constant second current signal as supplied to said converter and integrator.

5. The ground fault trip mode network defined in claim 3, which further includes means for generating a zone selective interlock output signal, said generating means conditioned by said fixed-time-delay pickup detector to issue a zone selective interlock output signal for communication to an upstream circuit interrupting device when said first voltage signal achieves equality with said pre-selected second voltage reference.

6. The ground fault trip mode network defined in claim 5, which further includes means responsive to a zone selective interlock signal communicated from a downstream circuit interrupting device for conditioning said fixed-time-delay pickup detector to establish a second voltage reference of a magnitude different than the magnitude of said pre-selected second voltage reference.

7. The ground fault trip mode network defined in claim 1, wherein said first current signal deriving means comprises
(1) a miniature current transformer having a toroidal core, a multi-turn secondary winding on said core and connected with said average detector, and a primary winding in the form of a conductor extending through said core, and
(2) current transformer means inductively coupled with the distribution for driving a current through said conductor indicative of the magnitude of any distribution circuit ground fault current.

8. The ground fault trip mode detector defined in claim 1, wherein said rectifying average detector includes
(1) a bridge circuit connected with said deriving means for developing a full-wave rectification of said first current signal as appearing on a signal bus,
(2) a first transistor having a collector-emitter circuit connecting said signal bus to a detector output terminal,
(3) a first capacitor connected with said signal bus to be charged by said rectified first current signal, said first capacitor supplying discharging current to said signal bus for conduction through said first transistor collector-emitter circuit to said output terminal,
(4) a second transistor,
(5) a second capacitor having a terminal connected commonly to said signal bus through the base-emitter junction of said second transistor and base of said first transistor, said second transistor developing an emitter voltage on said first transistor for generating said second current signal as a function of the average charge on said first capacitor.

9. The ground fault trip mode network in claim 8, wherein said first current signal deriving means comprises
(1) a miniature current transformer having a toroidal core, a multi-turn secondary winding on said core and connected with said average detector, and a primary winding in the form of a conductor extending through said core, and
(2) current transformer means inductively coupled with the distribution for driving a current through said conductor indicative of the magnitude of any distribution circuit ground fault current.

10. The ground fault trip mode network defined in claim 9, which further includes:
A. a fixed-time delay pickup detector connected with said converter for monitoring said first voltage signal with respect to a pre-selected one of plural second voltage references of different magnitudes; and
B. a current limiter connected intermediate said average detector and said integrator and controlled by said fixed-time delay pickup detector when said first voltage signal achieves equality with said pre-selected second voltage reference to limit said second current supplied to said squaring circuit to a fixed magnitude as determined by the magnitude of said pre-selected one of said second voltage references.

11. The ground fault trip mode network defined in claim 10, wherein said current limiter is also connected intermediate said average detector and said converter, and is controlled by said fixed-time delay pickup detector to shunt signal current from said converter and integrator, said fixed-time pickup detector including a differential amplifier to which said first voltage signal and said pre-selected second voltage reference are applied as separate inputs, the output of said amplifier controlling said current limiter to shunt sufficient signal current from said second current signal as developed by said average detector such as to maintain a constant second current signal as supplied to said converter and integrator.

12. The ground fault trip mode network defined in claim 11, which further includes means for generating a zone selective interlock output signal, said generating means conditioned by said fixed-time delay pickup detector to issue a zone selective interlock output signal for communication to an upstream circuit interrupting device when said first voltage signal achieves equality with said pre-selected second voltage reference.

13. The ground fault trip mode network defined in claim 12, which further includes means responsive to a zone selective interlock signal communicated from a downstream circuit interrupting device for conditioning said fixed-time-delay pickup detector to establish a second voltage reference of a magnitude different than the magnitude of said pre-selected second voltage reference.

14. A ground fault trip mode network comprising, in combination:
   A. current transformer means inductively coupled with an AC power distribution circuit and operative to develop a secondary current indicative of the magnitude of ground leakage current flowing through a ground fault on the distribution circuit;
   B. a miniature current transformer having a toroidal core, a primary winding through which the current transformer means secondary current is conducted, and a multi-turn secondary winding in which is developed a first AC current signal proportional to the primary winding current;
   C. a rectifying network for rectifying said first current signal;
   D. detector means responsive to said rectified first current signal for developing a proportionate second DC current signal;
   E. a converter connected with said detector means for developing a first DC voltage signal proportional to said second current signal;
   F. a pickup detector connected with said converter for monitoring said first voltage signal with respect to an adjustably pre-selected one of a plurality of voltage references of different magnitudes;
   G. an integrating capacitor connected with said pickup detector and controlled thereby to be charged at a rate determined by said pre-selected voltage reference when said first voltage signal achieves equality with said pre-selected voltage reference, whereby said integrating capacitor develops a second voltage signal whose magnitude varies with time; and
   H. a signal driver connected with said integrating capacitor to generate a circuit interrupting device trip initiating signal when said second voltage signal achieves a predetermined magnitude.

15. The ground fault trip mode network defined in claim 14, wherein said rectifying network full-wave rectifies said first current signal, and said detector means develops said second current signal as a function of the average amplitude of said rectified first current signal.

16. The ground fault trip mode network defined in claim 14, wherein said miniature current transformer primary winding is a single-turn primary winding.

17. Apparatus for utilization in a static trip circuit breaker to provide ground fault protection to a power distribution circuit, said apparatus comprising, in combination:
   A. a current transformer linked to each conductor of the distribution circuit and having a secondary winding in which is developed a current signal proportional to the current flowing therein;
   B. first and second buses;
   C. a full-wave rectifying network including plural pairs of like poled, series diodes connected in parallel between said first and second buses,
       one corresponding side of each said current transformer secondary winding connected to the junction between a different diode pair;
   D. an additional pair of like poled diodes connected between said first and second buses, the corresponding other sides of said current transformer secondary windings being connected in common via a lead to the junction between said additional diode pair, whereby, in the event of a ground fault on the distribution circuit, a component of the currents developed in said secondary windings flows through said single lead as a first ground fault signal current proportional to the magnitude of ground leakage current flowing through the fault;
   E. a miniature current transformer having a toroidal core and a multi-turn secondary winding, said lead passing through said toroidal core to provide a primary winding, whereby a second ground fault current signal is developed in said multi-turn secondary winding proportional to said first ground fault current signal; and
   F. a ground fault trip mode network connected with said multi-turn secondary winding for processing said second ground fault signal pursuant to initiating a ground fault trip function by the circuit breaker.

18. The ground fault trip mode network defined in claim 17, wherein said miniature current transformer primary winding is a single-turn primary winding.

* * * * *